US008082169B2

(12) United States Patent
Crew et al.

(10) Patent No.: US 8,082,169 B2
(45) Date of Patent: Dec. 20, 2011

(54) USER INTERFACE FOR WORKFLOW BUILDER

(75) Inventors: Laurence Crew, Redfern (AU); Daniel Bradbury, Rushcutters Bay (AU)

(73) Assignee: Canon Kabushiki Kaisha, Tokyo (JP)

( * ) Notice: Subject to any disclaimer, the term of this patent is extended or adjusted under 35 U.S.C. 154(b) by 1095 days.

(21) Appl. No.: 11/154,472

(22) Filed: Jun. 17, 2005

(65) Prior Publication Data

US 2006/0005140 A1    Jan. 5, 2006

(30) Foreign Application Priority Data

Jun. 18, 2004 (AU) ................ 2004903338

(51) Int. Cl.
*G06Q 10/00* (2006.01)
(52) U.S. Cl. ....... 705/7.26; 715/763; 715/771; 705/7.27
(58) Field of Classification Search .................. None
See application file for complete search history.

(56) References Cited

U.S. PATENT DOCUMENTS

| | | | | |
|---|---|---|---|---|
| 5,721,912 A * | 2/1998 | Stepczyk et al. | ............... | 707/102 |
| 5,774,661 A * | 6/1998 | Chatterjee et al. | ............ | 709/203 |
| 5,999,911 A * | 12/1999 | Berg et al. | .......................... | 705/9 |
| 6,308,188 B1 * | 10/2001 | Bernardo et al. | ............. | 715/234 |
| 7,136,865 B1 * | 11/2006 | Ra et al. | ........................ | 707/102 |
| 7,363,594 B1 * | 4/2008 | Wright et al. | .................. | 715/751 |
| 7,408,658 B2 * | 8/2008 | Twede | .......................... | 358/1.15 |
| 2002/0075293 A1 * | 6/2002 | Charisius et al. | ............. | 345/704 |
| 2002/0140731 A1 | 10/2002 | Subramaniam et al. | ...... | 345/762 |
| 2005/0256818 A1 * | 11/2005 | Sun et al. | ........................ | 706/46 |

OTHER PUBLICATIONS

Chang Siu, Clara Jaeckel, "Oracle workflow developer's guide, Release 2.6.3," Oracle Coporation, 2003.*
Cardoso Jorge et al., "Implementing QoS management for workflow systems," Technical report, LSDIS Lab, computer science, University of Georgia, Jul. 2002.*

* cited by examiner

*Primary Examiner* — Beth V Boswell
*Assistant Examiner* — Tzu-Hsiang Lan
(74) *Attorney, Agent, or Firm* — Fitzpatrick, Cella, Harper & Scinto (57) ABSTRACT

A method is disclosed for creating a workflow process. An initial activity (304, 316) is displayed. The method then displays a user interface diagram (FIG. 5) to configure a type of an activity to be added to the workflow process in response to a detection of designation of adding the activity. The type of the activity configured in the user interface diagram is then saved and the added activity (420, 312) whose type is configured is then displayed in the user interface diagram. In another form, the method shows an initial activity in the workflow process, the initial activity having associated therewith a list for selecting a starting activity. A first new activity is then added to the workflow process, the first new activity having associated therewith lists for selecting destination activities for each of a number of outcomes of the first new activity. The list for selecting a starting activity in the initial activity to include the first new activity is then updated. A second new activity is then added to the workflow process, the second new activity having means of selecting a corresponding destination activity for each of a number of outcomes of the second new activity. The list of starting activities in the initial activity and the lists of destination activities in the first new activity are each then updated to include the second new activity.

6 Claims, 11 Drawing Sheets

USER INTERFACE FOR WORKFLOW BUILDER

CROSS-REFERENCE TO RELATED PATENT APPLICATIONS

This application claims the right of priority under 35 U.S.C. §119 based on Australian Patent Application No. 2004903338, filed 18 Jun. 2004, which is incorporated by reference herein in its entirety as if fully set forth herein.

FIELD OF THE INVENTION

The present invention relates to computer based workflow applications and, in particular, to user interfaces for designing and representing workflow processes in computer based workflow applications.

BACKGROUND

There have been many computer based workflow applications with the purpose of automating aspects of processes such as business processes or manufacturing processes. In general, workflow applications for automating business processes automate the flow of documents and other information between persons in order to fulfil the requirements of a particular process and to track the progress of the process.

A workflow process typically consists of a number of tasks or activities, each of which might have documents or data associated with it, and a number of interrelationships between the activities determining the order of execution of the activities.

Since workflow processes are specific to particular businesses, generalized workflow applications must incorporate some method of specifying and/or customizing workflow processes to suit the particular business. Common methods for specifying or customizing workflow processes include writing configuration files such as text files or XML files; using an editor with a tabular format; and using a graphical workflow builder.

In the prior art, graphical workflow builders typically provide a range of icons representing various activities, in addition to connectors such as arrows that can be drawn between the icons in order to create a graphical representation of the workflow process.

Figure 2:
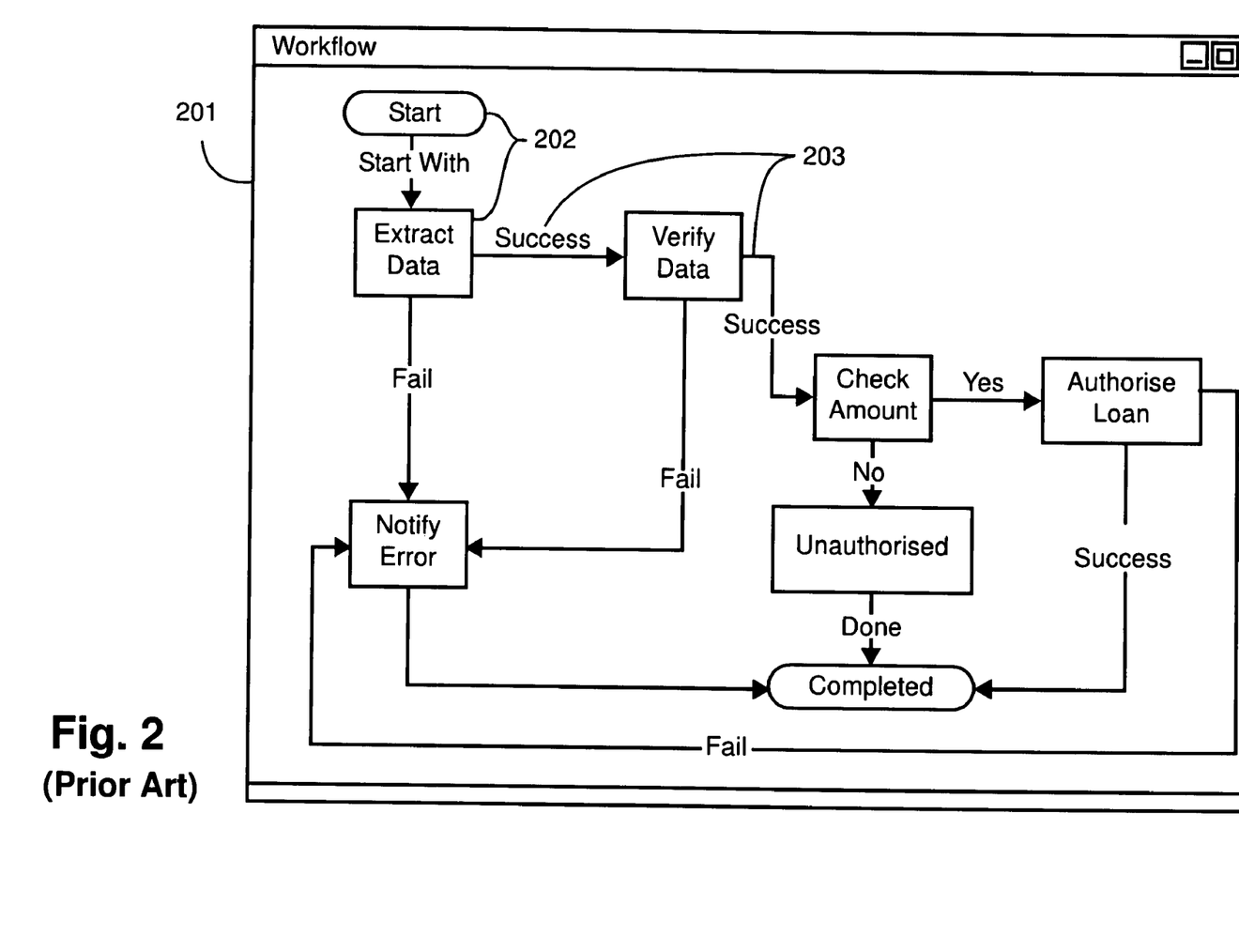
FIG. 2 illustrates a graphical workflow builder of the prior art.

FIG. 2 is an exemplary diagram showing a graphical workflow builder of the prior art. A window 201, representing a graphical user interface formed upon a computer display, contains a plurality of icons 202, each of which represents a particular activity in the workflow. Connectors 203 show the routing of the workflow between the activities. Each connector shows a label representing a condition that would result in the connector being followed.

While this style of graphical workflow builder is an effective means for designing and representing workflow processes, such is found to be difficult to implement effectively because of complex graphical and spatial arrangement requirements. This is especially the case in software environments that do not provide rich graphical display capabilities, such as in an application for display in a web browser. In addition, the use of common graphical workflow builders requires the user to possess the ability to create a relatively complex spatial arrangement in a freeform graphical space.

Non-graphical methods of specifying workflow processes such as configuration files and tabular editors do not provide the same ease of use as a graphical workflow builder; especially in the case where the user is a specialist in the business processes being specified rather than being a specialist in information systems.

SUMMARY

It is an object of the present invention to substantially overcome, or at least ameliorate, one or more deficiencies with prior arrangements.

The present invention affords a method of representing and specifying workflow processes that provides equal, if not superior ease of use to common graphical workflow builders, but in a way that is easy to implement in a non-rich graphical display environment such as in a web browser based application. The method does not require complex spatial arrangements to be created by the user.

In accordance with one aspect of the present invention there is disclosed method of creating a workflow process, said method comprising the steps of:
  (a) displaying an initial activity;
  (b) displaying a user interface diagram to configure a type of an activity to be added to the workflow process in response to a detection of designation of adding the activity;
  (c) saving the type of the activity configured in the user interface diagram; and
  (d) displaying the added activity whose type is configured in the user interface diagram.

In accordance with another aspect of the present invention there is disclosed a method of specifying a process, said method comprising the steps of:
  (a) showing initial and final activities, said initial activity having list for selecting a starting activity; said list initially containing only the final activity;
  (b) adding a first new activity, said activity having lists for selecting destination activities for each of a number of outcomes;
  (c) updating the list of starting activities in the initial activity to include the first new activity;
  (d) adding a second new activity, said activity having means of selecting a corresponding destination activity for each of a number of outcomes;
  (e) updating the list of starting activities in the initial activity to include the second new activity, and updating the lists of destination activities in the first new activity to include the second new activity.

In accordance with another aspect of the present invention there is disclosed a method of forming a workflow process in a computer system, said method comprising the step of:
  displaying a set of activity elements representing components of said process, each said activity element displaying a description of said activity element and a destination corresponding to at least another activity element in said set.

According to another aspect of the present invention there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the drawings, in which.

DETAILED DESCRIPTION INCLUDING BEST MODE

Figure 1:
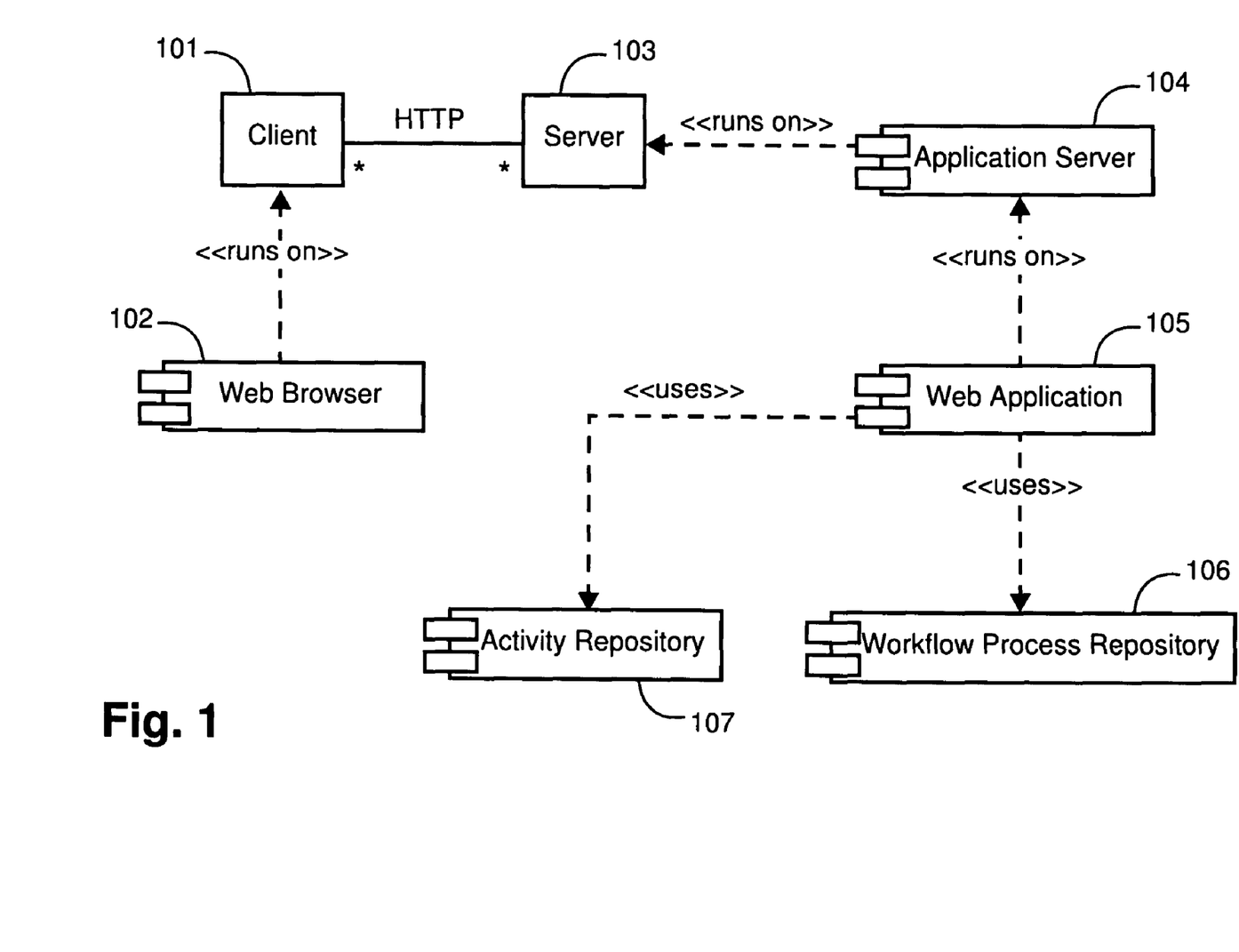
FIG. 1 is a schematic block diagram representation showing the system architecture for workflow construction.

According to the present disclosure, a server machine on which workflow application code is stored and executable, is also configured to dynamically generate a user interface to thereby configure workflow processes as HTML (Hyper-Text Markup Language) pages. These HTML pages are displayable on a web browser running on a separate client machine. FIG. 1 shows the architecture of an exemplary arrangement. A server machine 103 runs an application server 104. The application server 104 is capable of dynamically generating HTML pages using Java "Servlet" and "JSP" technologies. While these technologies are used for a preferred embodiment, any technology capable of dynamically creating a user interface may be used in alternative embodiments. Computer program code for dynamically generating the user interface is installed as part of a web application 105 within the application server 104. The dynamically created user interface is displayed in a web browser 102 running on a client machine 101. Communication between the client 101 and server 103 uses Hyper-Text Transfer Protocol (HTTP) and typically is performed over a communications network. The web application 105 draws upon a workflow process repository 106 and an activity repository 107, both of which may be configured within memory of the server machine 103, to support the application 105.

Figure 7:
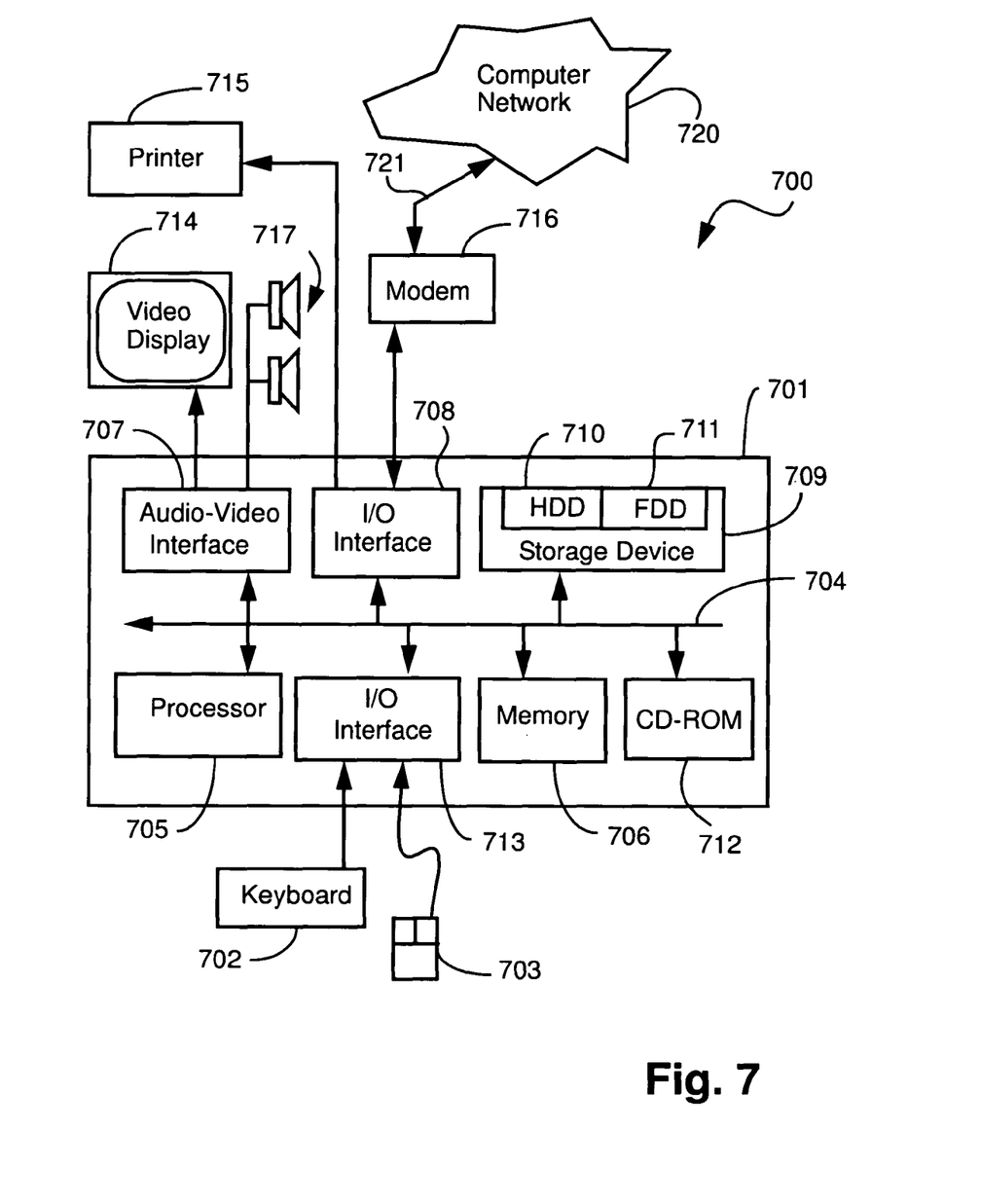
FIG. 7 is a schematic block diagram representation of an exemplary computer system, forming part of the architecture of FIG. 1 and with which the described processes may be performed.

Workflow process generation is preferably practiced using a general-purpose computer system 700, such as that shown in FIG. 7, which may be interpreted as either one or both of the client machine 101 and the server machine 103. The processes to be described, such as the application server 104, web application 105 or web browser 102, as the case may be, may be implemented as software, such as one or more application programs executing within the computer system 700. In particular, the steps of workflow generation are effected by instructions in the software that are carried out by the computer. The instructions may be formed as one or more code modules, each for performing one or more particular tasks. The software may also be divided into two separate parts, in which a first part performs the workflow generation methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for workflow generation. It will be appreciated that where the computer system 700 is configured as the client machine 101, such will be configured to execute the web browser 102 in order to interface with the server and web applications 104, 105. Similarly, where the computer system 700 operates as the server 103, such will be configured to operate the server and web applications 104, 105 so as to interact with the web browser 102 upon one or more client machines 101.

The computer system 700 is formed by a computer module 701, input devices such as a keyboard 702 and mouse 703, output devices including a printer 715, a display device 714 and loudspeakers 717. A Modulator-Demodulator (Modem) transceiver device 716 is used by the computer module 701 for communicating to and from a communications network 720, for example connectable via a telephone line 721 or other functional medium. The modem 716 can be used to obtain access to the Internet, and other network systems, such as a Local Area Network (LAN) or a Wide Area Network (WAN), and may be incorporated into the computer module 701 in some implementations.

The computer module 701 typically includes at least one processor unit 705, and a memory unit 706, for example formed from semiconductor random access memory (RAM) and read only memory (ROM). The module 701 also includes an number of input/output (I/O) interfaces including an audio-video interface 707 that couples to the video display 714 and loudspeakers 717, an I/O interface 713 for the keyboard 702 and mouse 703 and optionally a joystick (not illustrated), and an interface 708 for the modem 716 and printer 715. In some implementations, the modem 7116 may be incorporated within the computer module 701, for example within the interface 708. A storage device 709 is provided and typically includes a hard disk drive 710 and a floppy disk drive 711. A magnetic tape drive (not illustrated) may also be used. A CD-ROM drive 712 is typically provided as a non-volatile source of data. The components 705 to 713 of the computer module 701, typically communicate via an interconnected bus 704 and in a manner which results in a conventional mode of operation of the computer system 700 known to those in the relevant art. Examples of computers on which the described arrangements can be practised include IBM-PC's and compatibles, Sun Sparcstations or alike computer systems evolved therefrom.

Typically, the application program is resident on the hard disk drive 710 and read and controlled in its execution by the processor 705. Intermediate storage of the program and any data fetched from the network 720 may be accomplished using the semiconductor memory 706, possibly in concert with the hard disk drive 710. In some instances, the application program may be supplied to the user encoded on a CD-ROM or floppy disk and read via the corresponding drive 712 or 711, or alternatively may be read by the user from the network 720 via the modem device 716. Still further, the software can also be loaded into the computer system 700 from other computer readable media. The term "computer readable storage medium" as used herein refers to any storage medium that participates in providing instructions and/or data to the computer system 700 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 701. Examples of computer readable transmission media that may also participate in providing instructions and/or data to the computer system 700 include radio or infra-red transmission channels as well as a network connection to another computer or networked device, and the Internet or Intranets including e-mail transmissions and information recorded on Websites and the like.

Figure 6:
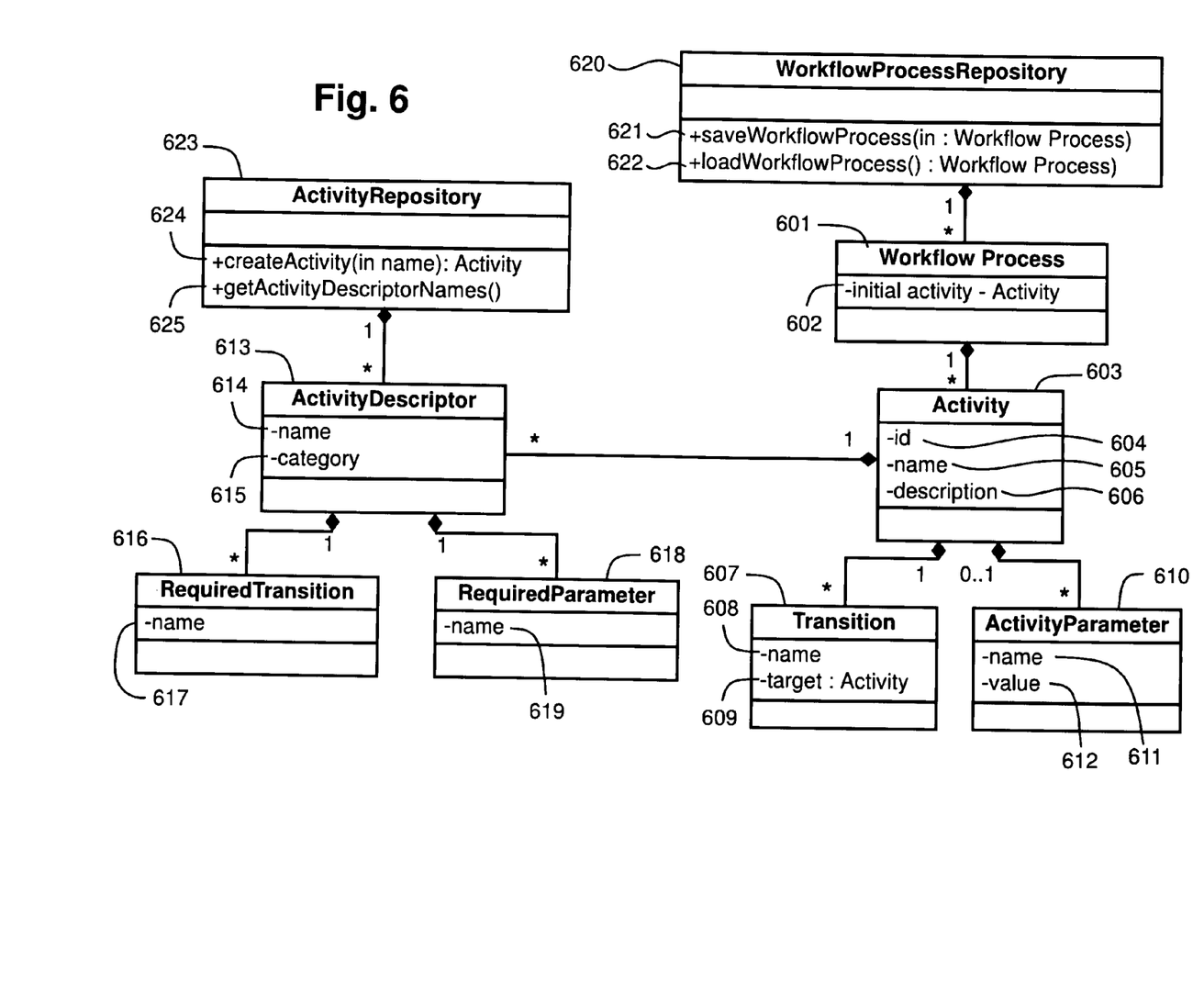
FIG. 6 is a class diagram showing the high level design of a workflow process.

To facilitate the configuration of a workflow process, the workflow process is displayed within a user interface which enables a user to manipulate the workflow process. To understand this user interface, it is necessary to understand the structure of the workflow process itself. FIG. 6 shows a class diagram describing the high level design of a workflow process, as well as the components required to load, store, and manipulate the process.

A workflow process 601 comprises a set of activities, of which one activity 603 is seen in FIG. 6. Each activity 603 represents a unit of work to be done within the workflow process 601. The activity 603 that is executed when a new instance of the workflow process 601 is commenced is marked as an initial activity 602 of the workflow process 601. An activity 603 typically has a set of transitions 607—one transition 607 for each of the possible outcomes of the activity 603. A terminal activity of a workflow process 601 will not have an outcome as such an activity concludes the process 601. Each transition 607 stores a unique identifier of a next activity 603 in the process 603 that should be executed, to give a particular outcome. This is seen in FIG. 6 as the "destination" or "target" 609 of the transition 607. Each transition 607 is also given a name 608, which is unique within set of transitions 607 for the activity 603.

To execute the workflow processes 601, a workflow engine may be traditionally used. The present disclosure is not concerned with process execution, but rather for configuring or building of the workflow processes 601.

Configuring a workflow process 601 involves selecting the activities 603 to perform, setting any parameters 610 required to execute these activities 603, and selecting or ascribing an order in which the activities 603 execute.

When an activity 603 is added to a workflow process 601, the activity 603 is selected from a list of available activities, sourced from an activity repository 623. The activity repository 623 manages the list of available activities, which may be called "activity descriptors" 613. Activity descriptors 613 include a name 614 and may be grouped into categories 615. The repository 623 further provides a first mechanism 624 to create an activity 603, given the name 614 of an activity descriptor 613, and a second mechanism 625 to get the list of the names 614 of all available activity descriptors 613. For example, all activity descriptors 613 related to invoking some other application or process may be assigned the category 615 called "process".

To illustrate the relationship between an activity 603 and an activity descriptor 613, suppose there is an activity descriptor 613 for the workflow process step of sending an email. The category 615 of this activity descriptor 613 may be "notify". The name 614 of the activity descriptor 613 may be "send email". When an activity 603 corresponding to this activity definition 613 is added to a workflow process 601, the activity repository 623 creates a new instance of the activity 603, based on the "send email" activity descriptor 613. This activity 603 is assigned a unique identifier 604 within the workflow process 601, and can then be given a name 605, for example, "send an email to Mr Smith". Optionally, the activity 603 can be given a more detailed description 606.

An activity descriptor 613 may also define a set of required parameters 618. These are those parameters that must be configured when an activity 603 is created from that activity descriptor 613. Each required parameter 618 comprises the name 619 of a corresponding activity parameter 610 which must be configured when the activity 603 is added to a workflow process 601. For example, when adding an activity 603 to send an email, three fields—the address to which the email should be sent, the message of the email, and the subject of the email—may be required. In this case, the activity descriptor 613 would have three required parameters 618, named "address", "message", and "subject" respectively. When an activity 603 corresponding to this activity descriptor 613 is added to a workflow process 601, the activity 603 must be configured with three activity parameters 610. When configured, the names 611 of these activity parameters 610 will match exactly the names 619 of the corresponding required parameters 618. The values set for these three activity parameters 610, which are specific to the instance of the activity 603, are stored in the value 612 of the activity parameter 610. For example, the "value" 612 of a "subject" name 619 for the sending of an email for the example of FIG. 3, to be described, could be "Your Loan Has Been Approved".

Every activity 603 has an associated set of transitions 607—one for each possible outcome of the activity 603. Once an activity 603 has been added to a workflow process 601, the destination/target activity 609 for each of corresponding transition 607 must be selected. In a preferred implementation, a set of transitions 607 for an activity 603 is determined by its corresponding activity descriptor 613. That is, all instances of a given activity 603 will have the same set of transitions 607. Also preferably, the set of outcomes for a given activity 603 are stored as a set of required transitions 616, belonging to the activity descriptor 613. Each required transition 616 has a name 617, which is unique within the activity descriptor 613. When an activity 603 is created from an activity descriptor 613, a transition 607 is created for every required transition 616 of the activity descriptor 613. The name 608 of the transition 607 matches the name 617 of the required transition 616. In alternative implementations, transitions may be added arbitrarily to an instance of an activity. When executing workflow processes, the workflow engine can determine which of these transitions to invoke by evaluating user-defined conditions associated with the transitions.

A workflow process repository 620, seen in FIG. 6, provides mechanisms respectively for loading 622 and saving 621 workflow processes 601. In the preferred embodiment, the workflow process repository 620 stores workflow processes 601 in a relational database, for example stored within memory (eg. 710) of the server machine 103.

In the preferred embodiment, the user interface for configuring workflow processes comprises two display screens that are reproduced upon the display 714 of the client machine 101. The screens include a workflow builder screen for manipulating the relationships between activities, and an activity configuration screen for adding and configuring individual activities.

Figure 3:
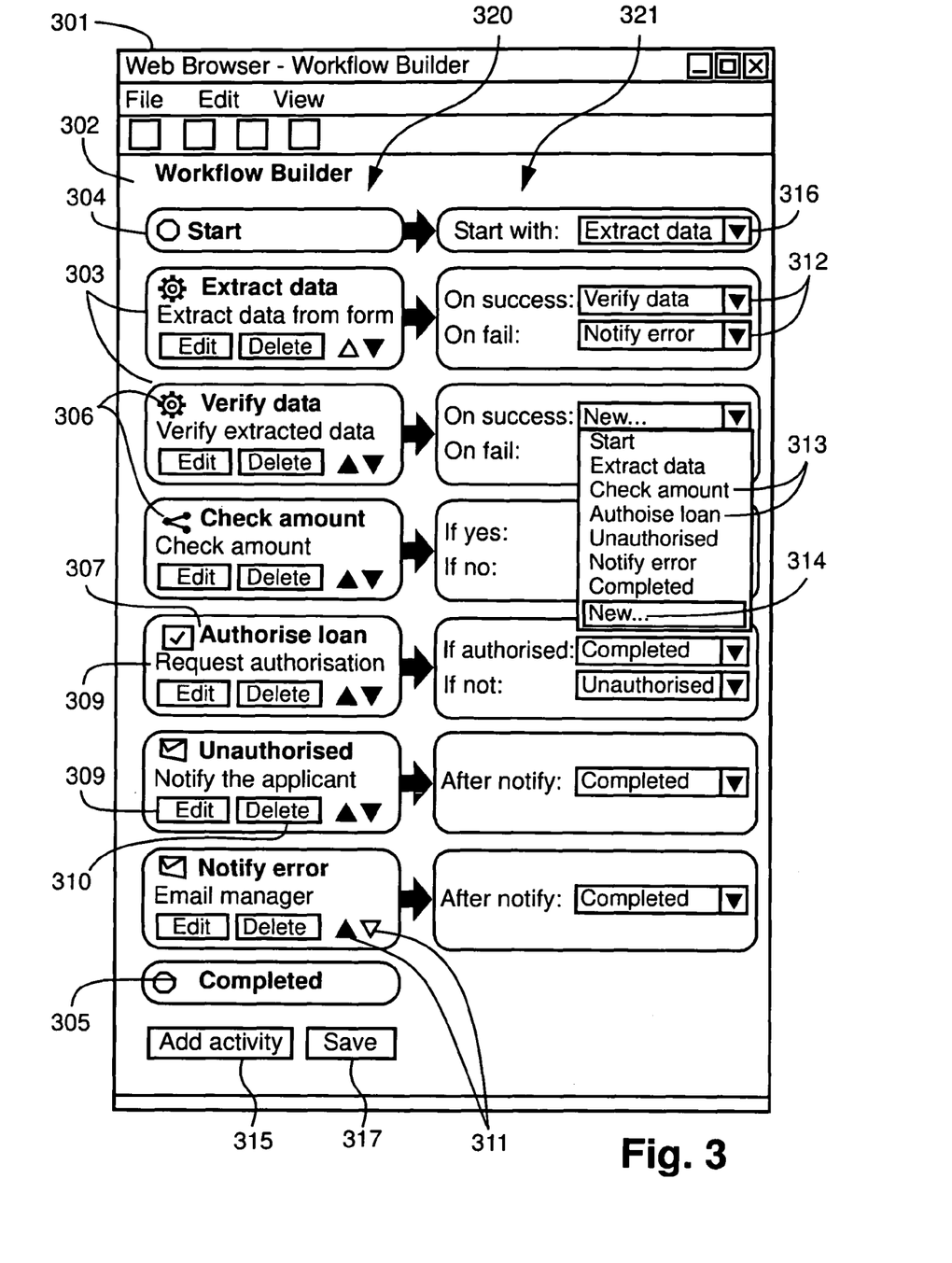
FIG. 3 depicts a graphical user interface showing a workflow builder of the present disclosure within a standard web browser window.

FIG. 3 shows a web browser application window 301 forming a graphical user interface (GUI) having document display area 302, such as may be reproduced upon the display 714 of the client machine 101 when executing the web browser 101 in communication with the web application executing upon the server machine 103. Shown within the document display area 302 is the workflow builder including of a number of activities 303, each comprising of a left-hand section 320 and a right-hand section 321 of a rectangular region of the document display area 302 and arranged vertically to form a list. Other implementations may use a horizontal arrangement of rectangular regions divided top/bottom, or a tabular arrangement of regions, for example. The left-hand section 320 collectively defines activities in the workflow process being constructed and the right-hand section 321 is used to define the destination or target for the adjacent associated activity. The illustrated activities in the example of FIG. 3 relate to a workflow process for the authorisation of a loan, such as may be performed by a bank or other financial institution.

Default activities include an initial activity 304 and a final activity 305. These default activities differ from normal activities in that they cannot be renamed, moved or deleted. In the case of the final activity, only the left hand section is shown as there are no outcomes or destinations. In an alternate implementation, provision may be made to initiate another process upon completion of the current process, using the destination selector of the final activity as a means of selecting the next process.

In the left hand section of each activity is shown an icon 306 which may be used to identify the activity category 615 and the activity name 307, corresponding to the name 605. Also shown is additional activity information 308 such as a description of the activity, corresponding to the description 606, as well as an 'edit' button or icon 309, a 'delete' button or icon 310 and 'up'/'down' buttons or icons 311. It will be appreciated that a reference to a 'button' with respect to the GUI 301 is a reference to a graphically presented icon that is user selectable, for example through manipulation of the mouse 703 and a corresponding mouse cursor, typically displayed in the GUI 301 but omitted from FIG. 3 to maintain clarity.

The 'edit' button 309 of the activities 303 allows the user to edit any properties of the activity 303 while maintaining interrelationships with other activities 303. The 'delete' button 310 removes the activity 303 from the workflow and, in a preferred implementation, resets any destination/target selectors 609 previously set to the deleted activity to a default destination, being the final activity.

The 'up'/'down' buttons 311 enable the user to re-organise the activities 303 in the workflow by moving them up or down in the list of activities. Typically, the order of display of the activities has no direct effect on the order of execution of the workflow and re-ordering is provided solely for the convenience of the user. However, the order of display may be used to influence the order of execution, for example by providing 'next' and 'skip' destinations in the destination/target selectors.

In the right-hand section 321, each activity 303 (with the exception of the final activity 305) are one or more drop-down destination selectors 312, each corresponding to one possible outcome of the corresponding activity and labelled accordingly. A user of the GUI 301 may select from a pick list in the drop-down selector 312 a desired destination activity for the activity presently being incorporated or edited within the workflow process. The selected value in each destination selector 312 indicates the destination activity corresponding to the outcome of the present activity.

In alternate implementations, the drop-down selectors may be replaced with other means for selecting items from a list, for example pop-up dialog boxes containing selectable items, preferably containing hyperlinked items accessible via the web browser 102.

Each destination selector 312 contains a list of destinations 313 corresponding to the activities currently in the workflow process. Preferably, activities do not include themselves in the list of possible destinations for their outcomes. With that exception, the list of possible destinations will be the same for all outcomes of all activities at any particular time.

Each drop-down selector 312 additionally shows a 'New . . . ' pseudo-destination option 314, having dual functions to add a new activity and also to set the destination to correspond to the newly added activity.

An 'Add activity' button 315 as seen in the GUI 301 is used to add a new activity, which by default will be inserted immediately above the final activity 305. A 'Save' button 317 submits the activity configuration to the server machine 103 and optionally returns to a main menu or other screen in the web application 105 not directly related to the configuration of individual workflows.

Whenever the list 320 of activities changes, such as when a new activity is added, an activity is deleted, an activity is moved up or down, or the name of an activity is changed, each list of activities 313 for each outcome of all current activities in the workflow is updated to reflect the changes.

Figure 8:
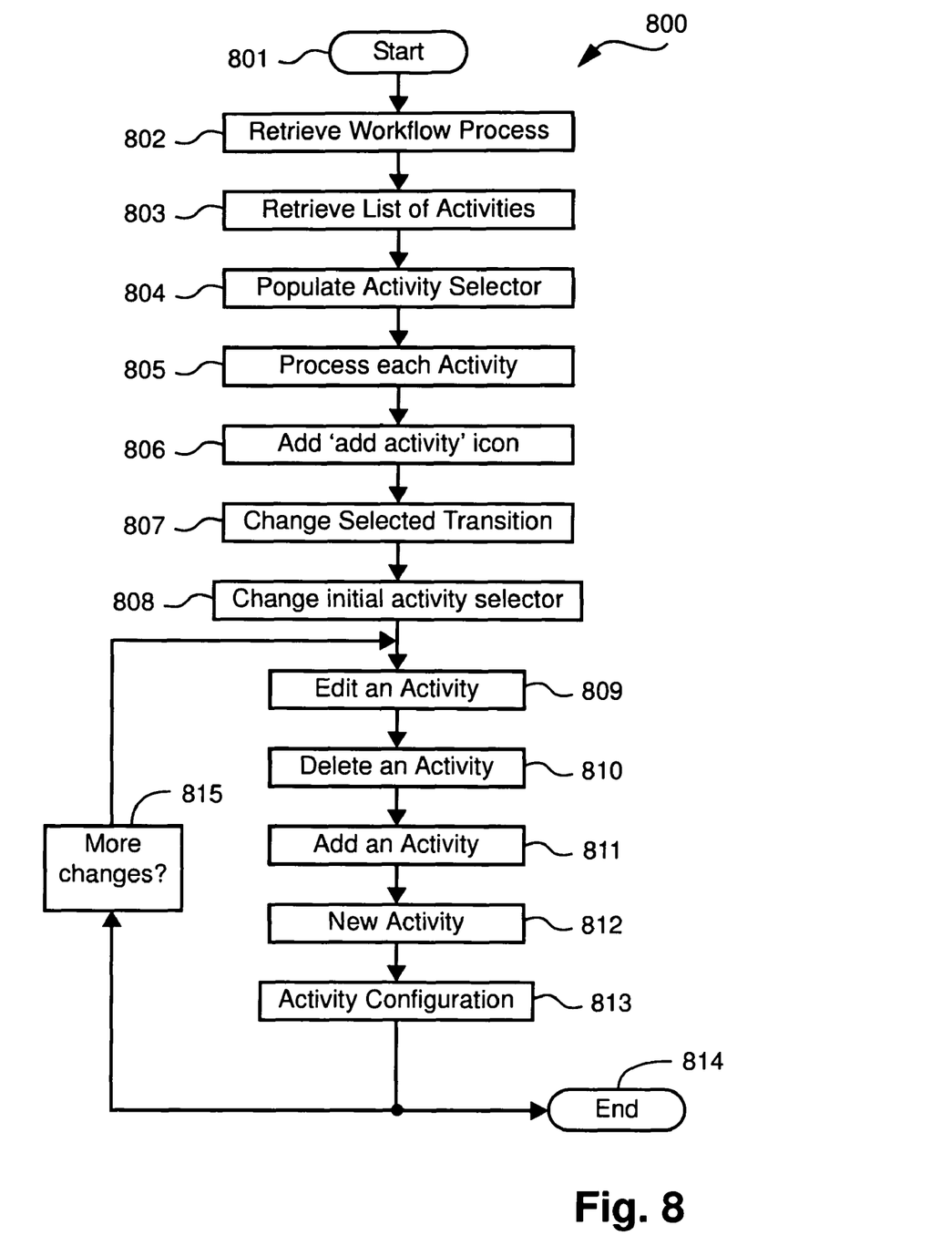
FIG. 8 is a flowchart depicting operation of the web application.

The Workflow Builder GUI 301 shown in FIG. 3 is generated and managed by the web application 105, an outline of whose operation is depicted in FIG. 8 as a flowchart of code steps that may be implemented upon the server machine 103 within the server application 104. The web application 105 preferably operates a method 800 which is instigated at step 801, generally according to a request for workflow processing from the web browser 102, such as a call to a particular web page via a Uniform Reference locator (URL). The method 800 operates as follows:

(i) Initially at step 802 a user selected workflow process is retrieved from the workflow process repository 106. The method 800 then proceeds to build the GUI 301 according to the selected process and user responses.

(ii) Next, the list of all activities is retrieved in step 803, and used to build and populate an initial activity selector 316 in step 804 as described above with one entry for each activity. The initial activity of the workflow process is made to be the selected element in the selector 316. Also an entry with the text "New" is included, which allows a user to add a new activity and set this activity as the initial activity of the workflow process.

Figure 9:
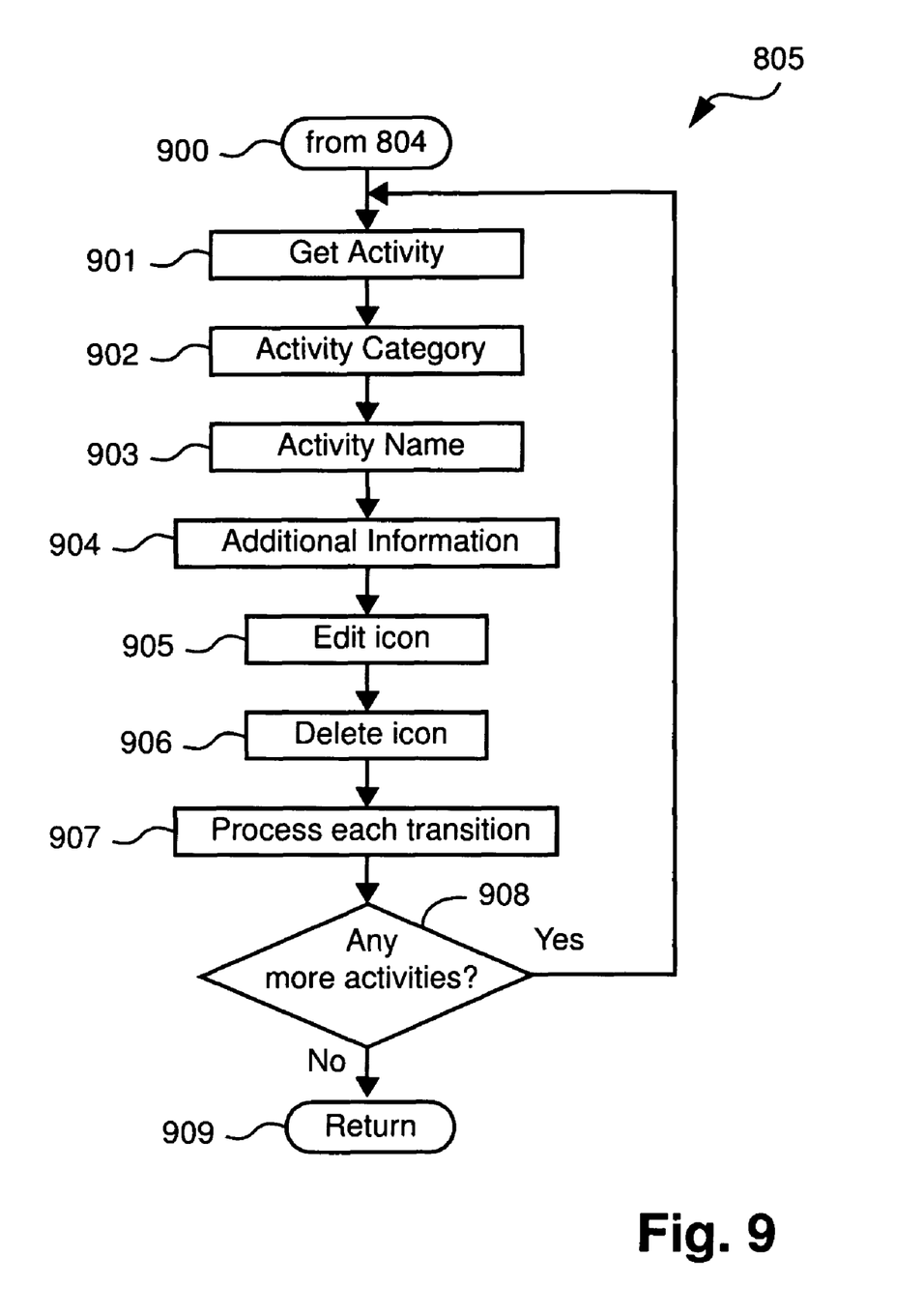
FIG. 9 is a flowchart of the processing of each activity of FIG. 8.

(iii) Step 805 then processes every activity within the workflow process. Detail of this step is shown in FIG. 9 which shows an entry point 900. Initially an activity is retrieved at step 901 for processing.

(iii-a) Step 902 then operates to populate the activity category icon 306, based on the category of the retrieved activity.

(iii-b) Step 903 then populates the activity name 307.

(iii-c) If the activity also contains a description, step 904 populates the additional activity information 308.

(iii-d) Step 905 adds the button 309 to edit the retrieved activity. The edit button 309 is encoded with the unique identifier of the activity, which is used to identify the activity to edit when the button is selected.

(iii-e) Step 906 adds the button 310 to delete the retrieved activity. The delete button 310 is encoded with the unique identifier of the activity, which is used to identify the activity to delete when the button is selected.

Figure 10:
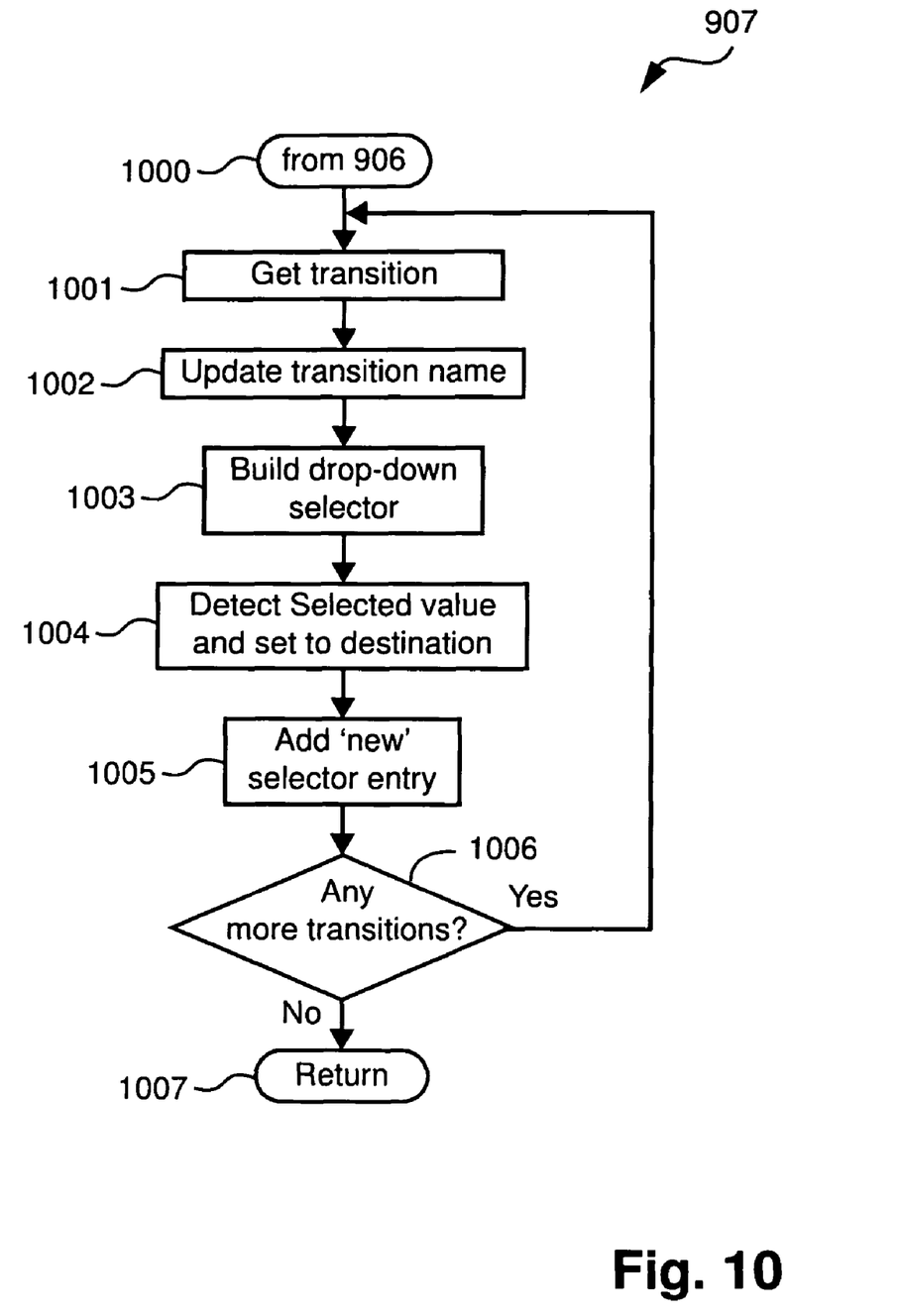
FIG. 10 is a flowchart of the processing of a transition of FIG. 9.

(iii-f) Step 907 then operates to process every transition associated with the activity. Detail of step 907 is seen in FIG. 10, which has an entry point 1000, and operates as follows:
    (iii-fa) Step 1001 gets a first transition for the activity and step 1002 adds the text "on [transition name] go to", replacing [transition name] with the name of the current transition.
    (iii-fb) Step 1003 then operates to build the selector 312 containing the names of every other activity in the workflow process. Each selector 312, for the corresponding activity, has a unique identifier associated with it, which is a combination of the unique identifier of the activity to which is belongs, and the identifier of the transition.
    (iii-fc) Step 1004 then operates to set the selected value in the selector 312 to the 'destination' activity of the transition. If the transition has no destination activity, the selected value is set to be the final activity 305 in the workflow process.
    (iii-fd) Lastly, step 1006 adds an entry to the selector 312 with the text "New". When this option is selected by a user, a new activity is added and becomes the destination of the given transition. Details of this are described later in this document, with reference to FIG. 3.

When step 1005 concludes, step 1006 tests as to whether any more transitions require processing. If so, control is returned to step 1001 where the next transition is retrieved for processing. If not, step 1007 returns to the process of step 805 in FIG. 9.

When step 907 is concluded, step 908 checks to determine if any more activities remain to be processed. If so, control returns to step 901 when the next activity is retrieved and the step 805 proceeds as before. Alternatively, step 805 concludes and step 907 causes a return to the main process 800 of FIG. 8.

(iv) After step 805, step 806 operates to add the "add activity" button 315, to the GUI 301. This is used for adding an activity without specifying a transition with which the activity is associated.

Figure 5:
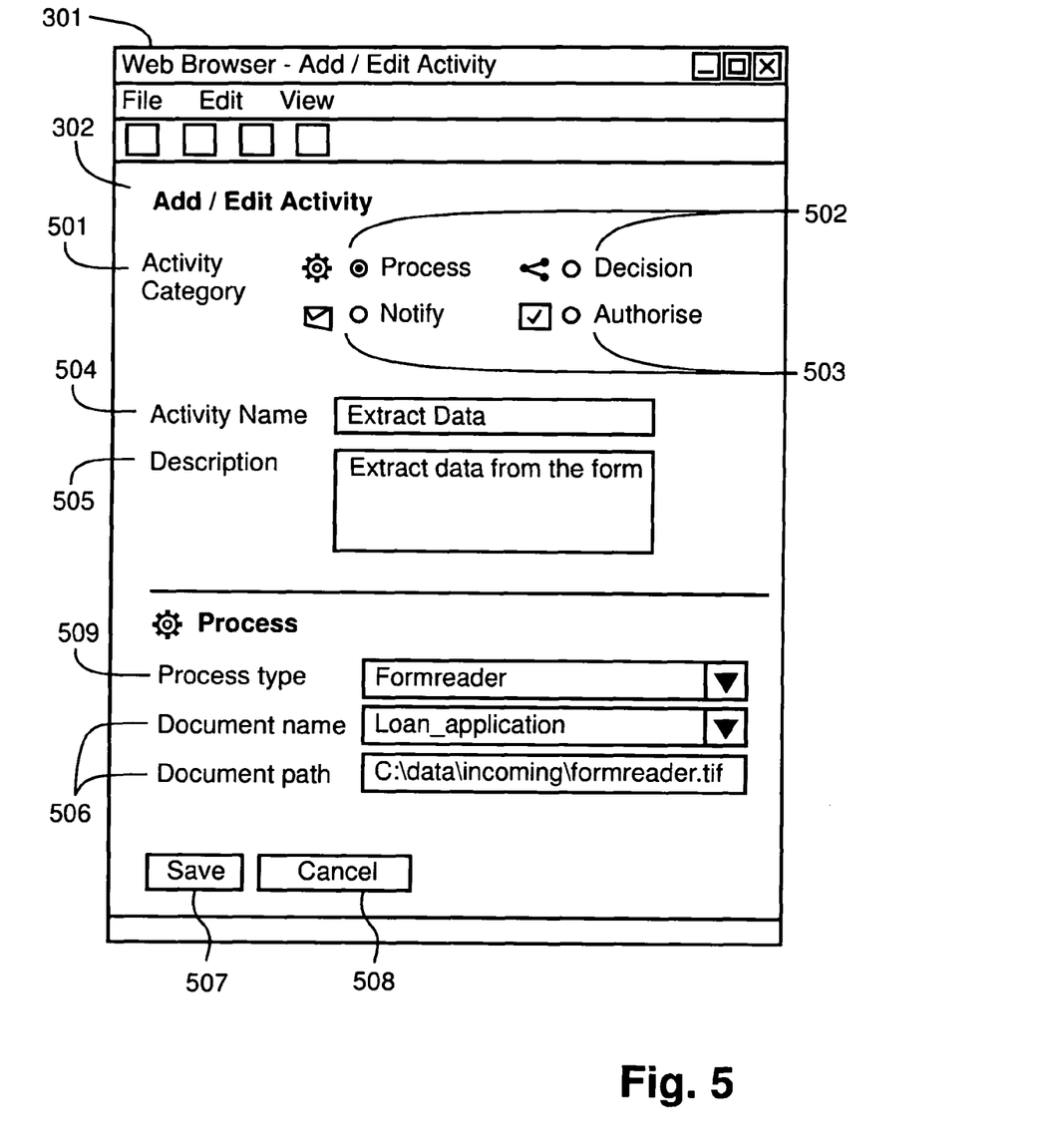
FIG. 5 is a user interface diagram showing a configuration screen for a workflow activity.

Steps 801-806 described above effectively build a selected workflow process display 302 within the GUI 301 into a form that may then be user manipulated to create a new or modified workflow process. From the Workflow Builder screen 301, the following actions can then be performed, as further depicted in FIG. 8:

(v) Step 807 may be used to change the selected option in a selector 312 associated with a transition of an existing activity 312. In one implementation, this initiates a request to the server 103. The web application 105 then determines the newly selected value, and updates the appropriate transition within the appropriate activity of the workflow process, such that the destination of the transition becomes the activity corresponding to the newly selected value in the selector 312. The workflow process is then saved using the workflow process repository 106, and the workflow configuration screen 302 is redrawn within the GUI 301.
    (vi) Step 808 may be used to change the selected value from the initial activity selector 316. This initiates a request to the server 103. The web application 105 sets the initial activity of the workflow process to be the activity corresponding to the newly selected value in the selector 316. The workflow process is then saved using the workflow process repository 106.
    (vii) Step 809 may be used to edit an activity. Such is activated by a user selecting, via the mouse 703 for example, the edit button 309 associated with that activity. This initiates a request to the server 103, and passes the unique identifier of the activity to edit as a parameter. The server 103 uses the unique identifier to retrieve the activity to be edited from the workflow process. The server 103 then builds the activity configuration screen and populates it according to this activity. This process is described in detail below, when describing FIG. 5.
    (viii) Step 810 may be used to delete an activity by selecting the delete button 310. This initiates a request to the server 103, and passes the unique identifier of the activity to delete as a parameter. The web application 105 uses this unique identifier to locate then remove the appropriate activity from the workflow process. It also checks whether any other activity has a transition which points to the deleted activity. For every matching transition, the destination activity is set to be the final activity 305 of the workflow process.
    (ix) Step 811 may be used to add an activity using the add activity button 315. This initiates a request to the server 103. The web application 105 builds the activity configuration screen, as described in FIG. 5, with all fields unpopulated.
    (x) Step 812 may be used to select the "New" option from the selector associated with a transition of an existing activity 314. This initiates a request to the server 103. The web application 105 then determines the transition corresponding to the selector from which the "New" option was selected. The application 105 then builds the activity configuration screen as shown in FIG. 5. Note that once the new activity has been created and saved, the web application 105 will update the workflow process such that the destination activity of the transition corresponding to the selector from which the "New" option was selected points to the newly created activity.
    (xi) Step 813 may be used to select the "New" option from the initial activity selector 316. This initiates a request to the server 103. The web application 105 records that the "New" option was selected from the initial activity selector 316 and then builds the activity configuration screen as shown in FIG. 5. Note that once the new activity has been created and saved, the web application 105 will update the workflow process such that the initial activity points to the newly created activity.

The method steps 809-813 may be recalled at the whim of the user to implement more changes to the workflow process being constructed or modified. This is depicted in FIG. 8 by step 815 but it will be appreciated that step 809-813 need not all be called and further that such may be called in any order, depending upon the user's desired alteration at the particular time. Once construction and editing are concluded the web application may end at step 814, for example by the user choosing to depart the particular instance of the web page upon which the workflow process is build by the application 105.

Figure 4A:
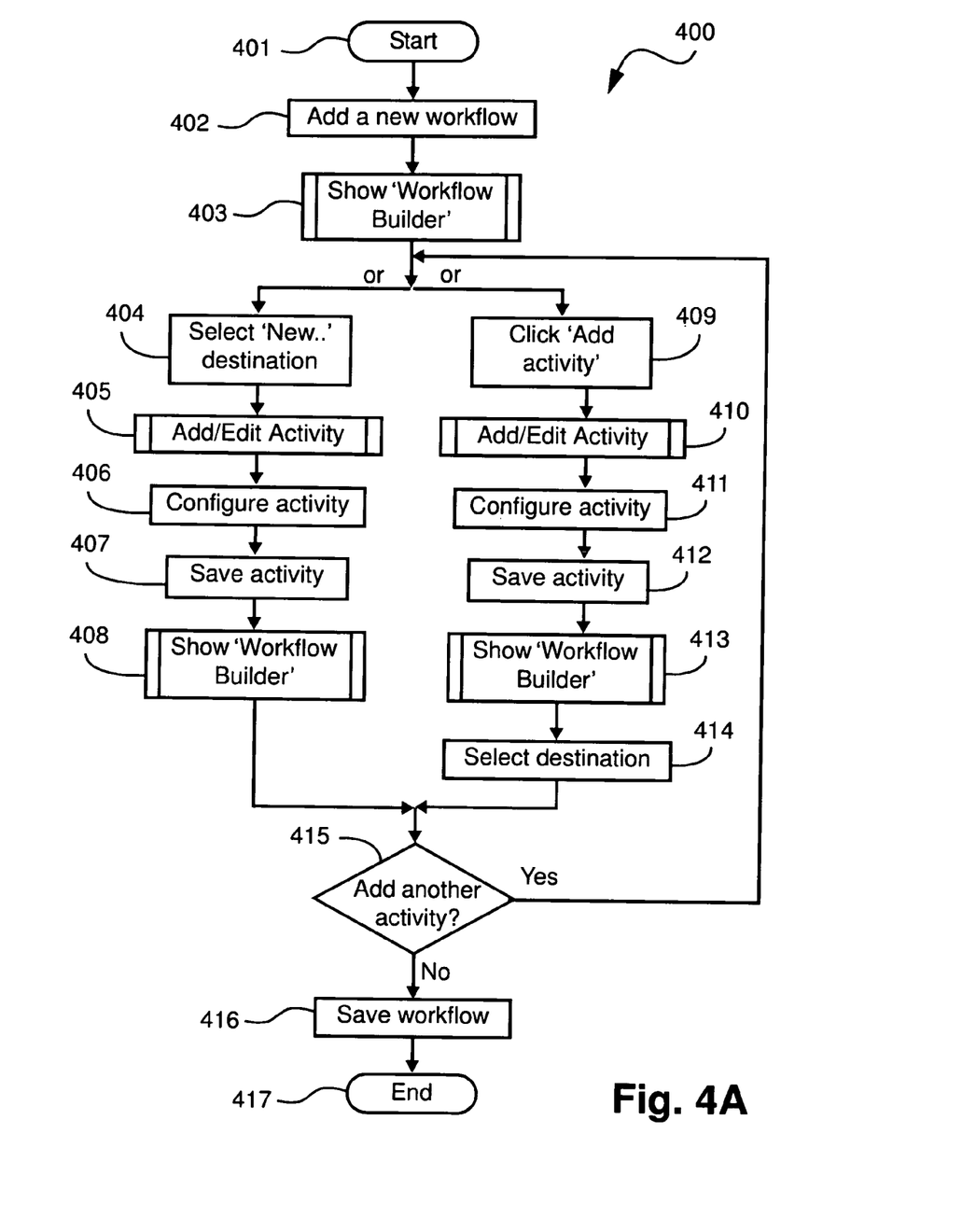
FIG. 4A is a flowchart illustrating a process employed to create a workflow and configure the corresponding activities and activity flow according to the present disclosure.

FIG. 4A is a flowchart illustrating a process 400 employed by the user to create a new workflow and configure the corresponding activities and activity flow. The process 400 begins at step 401. It may be assumed at this point that the user has enabled the web browser 102 and navigated to the workflow configuration application 105 resulting in an opening of a browser window 301, in a manner substantially as depicted in FIG. 3. At step 402, the user initiates the addition of a new workflow, for example by clicking an 'add new workflow' button on a main menu screen (not illustrated). This call is transmitted to the web application 105 for processing.

Figure 4B:
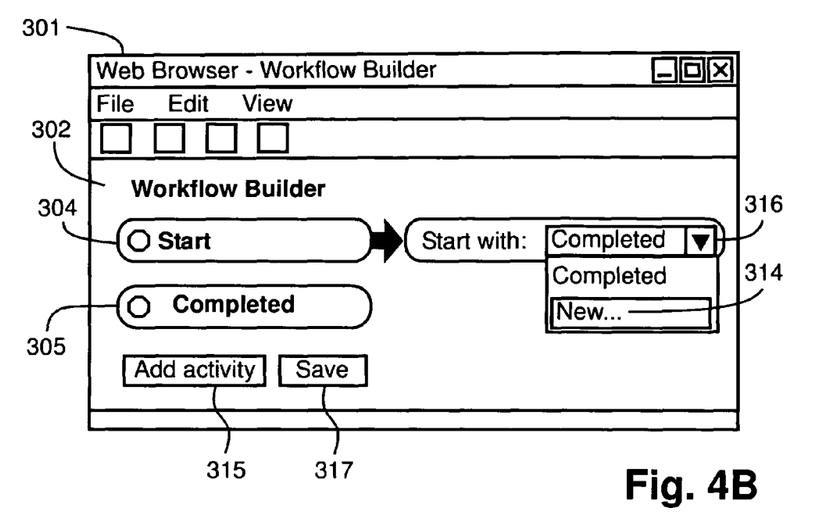
FIG. 4B is a user interface diagram showing the initial state of a workflow with no activities.

At step 403, the web application 105 constructs and sends to the browser 102 a workflow configuration screen showing an empty workflow as illustrated in FIG. 4B. The empty workflow contains only the default activities 304, 305; and the destination selector 316 of initial default activity 304 is set to 'completed'; corresponding to the final default activity 305.

Figure 4C:
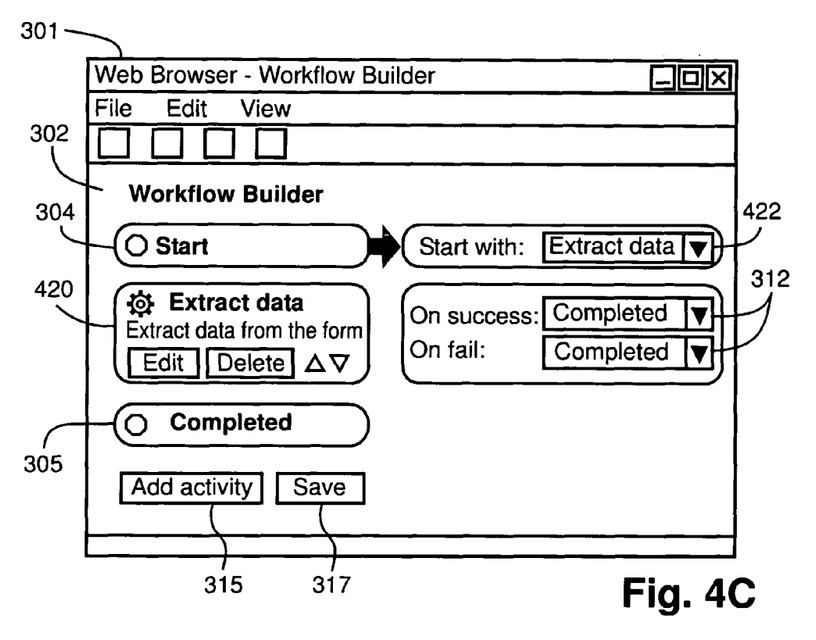
FIG. 4C is a user interface diagram showing the workflow after one activity has been added.

At step 404, the user has elected to add a new activity by selecting the 'New . . . ' option 314 in the destination selector 316. At step 404, the user has elected to add a new activity by selecting the 'New . . . ' option 314 in the destination selector 316 or Add activity 315. At step 405, the 'Add/Edit Activity' screen as shown and described in FIG. 5 is constructed by the web application 105 and sent to the browser 102, in response to selecting the 'New option 314' or Add activity 315. At step 406, the user configures the new activity providing at least an activity category, activity type and activity name. The 'Add/Edit Activity' screen is closed in response to saving the activity configuration details. At step 407 the user clicks the 'save' button 507 on the 'Add/Edit Activity' screen (FIG. 5). At step 408 the activity configuration details provided in step 406 are returned to the web application 105 and saved in the activity repository 107 of the workflow database. The 'Workflow Builder' screen 302 is then re-constructed by the web application 105 and returned to the browser 102 for reproduction to the user. As shown in FIG. 4C, the workflow 302 now contains the newly added activity 420. Additionally the destination selector 422 of the initial default activity 304 is set to correspond to the newly added activity 420 since the addition of the activity 420 was initiated using that same destination selector. This operation occurs in the branch of the flowchart 400 including steps 404-408.

At step 409 an alternate branch is commenced where the user has elected to add a new activity by clicking the 'Add activity' button 315. At step 410, the 'Add/Edit Activity' screen as shown in FIG. 5 is constructed by the web application 105 and sent to the browser 102. At step 411, the user configures the new activity providing at least an activity category, activity type and activity name. At step 412 the user clicks the 'save' button 507 on the 'Add/Edit Activity' screen. The activity configuration details provided in step 411 are returned according to step 413 to the web application 105 and saved in the workflow database. The 'Workflow Builder' screen is re-constructed by the web application 105 and returned to the browser 102. As shown in FIG. 4C, the workflow now contains the newly added activity 420 however the destination selector 316 of the initial default activity 304 is still set to its previous destination corresponding to the final default activity 305. In order to include the newly created activity 420 in the workflow, at step 414 the user selects the item corresponding to the activity 420 in the destination selector 422 of the initial default activity 304.

At step 415 the user decides whether to add any further activities to the workflow, or otherwise to save the completed workflow. If the user decides to add further activities, the process returns to either step 404 or step 409 and repeats. Otherwise the process continues to step 416 where the user clicks the 'Save' button 317. The workflow configuration information is submitted back to the web application server 103 and stored in the workflow database 106. The workflow configuration process ends at step 417 where the user is optionally returned to a main menu or other screen (not illustrated) in the application 105.

FIG. 5 shows a web browser window 301 forming a user interface diagram with the document display area 302. Shown within the document display area 302 is a workflow activity configuration screen including:

activity category selection area 501, comprising a number of pre-defined activity categories each selectable by a "radio-style" button 502 and optionally identified by an icon 503;
  activity name field 504;
  activity description field 505; and
  pre-defined activity-specific data fields 506.

A 'notify' activity, for example, may have data fields for recipient email address and message; whereas a 'decision' activity might allow the user to specify a conditional expression with a number of outcomes.

Buttons 507, 508 respectively save the data shown on the screen and return to the workflow builder screen as shown in FIG. 3, and discard any changes made to the data on the screen and return to the workflow builder screen.

In a preferred implementation, the value entered in the activity name field 504 enables the user to identify the activity within the workflow process. This may require validation to be applied to the field to ensure that the value entered is unique and suitable for identifying the activity. A system-generated unique identifier such as a numeric ID is also applied to each activity in order to keep track of it in the case that the name is changed. However, from a user's point of view the name is the unique identifier.

The workflow activity configuration screen of FIG. 5 is shown whenever an activity is added or edited, such as when the 'add activity' button 315, any of the 'edit activity' buttons 309, or the 'New . . . ' pseudo-destination 314 of FIG. 3 are selected for any activity.

In the case that an activity is added by selecting the 'New . . . ' pseudo-destination for an existing activity, a system generated unique identifier is first generated for the new activity, and stored against the destination of the corresponding outcome of the present activity. The workflow activity configuration screen of FIG. 5 is then shown, and the system generated unique identifier is maintained along with any additional data provided by the user in the workflow activity configuration screen.

If the user subsequently chooses to cancel the addition of the new activity by clicking 'cancel' button 508, the system generated unique identifier is discarded and the destination of the corresponding outcome of the original activity is reverted to its previous value.

To edit an existing activity, the web application 105 builds the workflow activity configuration screen of FIG. 5 as follows:

(a) The activity being edited is retrieved from the workflow process repository 106. This is done by the web application 105 determining the unique identifier of the activity, which is used to retrieve the activity.

(b) The "Activity Category" 501 is set according to the value of the activity being edited. Also, the "Activity Name" 504 is populated according to the name of the activity being edited.

(c) The "Description" 505 is populated according to the description of the activity being edited.

(d) The activity selector 509 is populated. The selector 509 contains an entry for every activity descriptor available to be added to a workflow process, which is of the selected activity category 615. In this example, the activity selector 509 includes a "process/activity type" of "Formreader" with a "document name" of "Loan_application", representative of an automated process or activity for reading data from a loan application form. The web application 105 builds this selector by querying the activity repository 107 for all activity descriptors matching the selected category 615.

(e) All configuration parameters specific to the selected activity 506 are populated.

When adding a new activity, the web application 105 builds the workflow activity configuration screen of FIG. 5, with the activity category 501 defaulting to "process". No value exists for the activity name 504, or the description 505. The activity selector 509 is built with an entry for every activity definition with a category of "process", but no value is selected.

From the activity configuration screen, the following actions can be performed:

(a) Change the selected value in the activity selector 509. The web application 105 receives a request from the web browser 102. The activity name 504 and description 505 are updated to reflect the values entered by the user. The web application 105 determines the activity that has been selected in the activity selector 509. The web application 105 then retrieves a new instance of the selected activity from the activity repository. The web application 105 next rebuilds the workflow activity configuration screen, with the new activity selected in the activity selector 509. Fields are provided for all of the configuration parameters 506 required for the newly selected activity, based on the required parameters of the activity's corresponding activity descriptor.

(b) Change the selected value of the activity category 501. This initiates a request to the web server 103. The web application 105 updates the activity name 504 and description 505. The activity selector 509 is deselected, and all configuration parameters for the previously selected activity (if one was previously selected) are discarded. The web application 105 then rebuilds the workflow activity configuration screen, with the new activity category selected.

(c) Select (press) the save button 507. The web application 105 receives a request from the web browser 102 to save the activity. The web application 105 retrieves the values of all fields entered in the workflow activity configuration screen of FIG. 5, and updates the workflow process using the workflow process repository 106. If the workflow activity configuration screen was built from a 'New . . . ' option 314 on the workflow builder screen (FIGS. 4A to 4B), the transition to which the 'New . . . ' option 314 corresponds is updated so that the newly created activity is the destination of this transition. If a new activity has been created—either from the 'New . . . ' option 314 or from the 'Add Activity' button 315, the newly created activity is now part of the workflow process. Accordingly, all selectors 312 will now include an entry for the newly created activity. The web application 105 finally rebuilds the workflow builder screen.

(d) Press the cancel button 508. The web application 105 receives a request to cancel the activity edit. All changes are discarded, and the web application 105 rebuilds the workflow builder screen, as it was before the workflow activity configuration screen was entered.

The arrangements described above permit the construction and/or editing of a workflow process in such a way that unskilled users may develop the process with express knowledge of where in the process, with respect to a present activity, a following activity be represented. This is achieved according to the present disclosure by automatically updating all possible destination/target pick lists 316 in the workflow builder whenever a new activity is added or an activity is deleted. Thus, an essentially linear list of activities may be presented to the user, as in FIG. 3, whilst at the same time affording the user the ability to select a destination/target for an activity as substantially any one of the other activities in the list. The net result of this is that the unskilled user has little knowledge or interest in how the workflow "looks", in terms of its graphical presentation, but may be concerned, perhaps exclusively, with the actual sequence of activities given certain process events. Further creation of the workflow process in a menu driven manner obviates reliance upon sophisticated graphical tools and permits implementation in a convenient fashion as a web application arranged to interact with a generic web browser. Use of a generic user interface (ie. a web browser) permits ease of use by unskilled persons.

The unconstrained nature of pick lists representing all available activities can permit a user to select of otherwise establish an erroneous workflow, such as one that is not complete or one that includes an irresolvable loop. Such errors may be accounted for using a logical checking system associated with the workflow engine mentioned above. However, the present disclosure relies upon the premise that, whilst the user may not be highly skilled in workflow construction, the user nevertheless does know or appreciate the particular workflow the user wants.

As seen from FIG. 3, the destination/target activity may be represented by a conditional branch or one of a plurality of destinations. For example, the "Unauthorised" activity performs a notification to the applicant for the loan and has a destination of the "Completed" activity. The "Authorise Loan" activity has multiple destinations being "Complete" if authorised and "unauthorized" if not. Given the loan application workflow process of FIG. 3, a logical selection for the destinations for the "Verify Data" activity would be "Check Amount" for a successful verification, and "Notify Error" for a failure to verify.

One significant advantage of the present disclosure is the ability for the linearized creation of a non-linear workflow. In this regard, the lists of activities seen on the left-hand side 320 in FIG. 3 represent a linear presentation of information, whilst the linking of the activities defined on the right-hand side 321 affords for a non-linear process to be formed.

It is further observed that an activity element within a workflow may have itself as one possible outcome. One example of such an activity element may be "Wait for an email" which may have two output target destinations, like some of the activities in FIG. 3. Those destinations could be, for no email received "Wait for an email" or for when an email is received "Print a hard copy". The net effect of this is that when a new activity is added to a workflow process and the pick list of destinations for all activities is updated with the name of the new activity, so too is the pick list of the new activity. In some instances, user selection of such a target destination may produce a nonsensical result, however, as noted above, the present disclosure assumes the user understands the workflow desired to be implemented.

INDUSTRIAL APPLICABILITY

It is apparent from the above that the arrangements described are applicable to the computer and data processing industries and particularly in process development and control of workflow arrangements.

The foregoing describes only some embodiments of the present invention, and modifications and/or changes can be made thereto without departing from the scope and spirit of the invention, the embodiments being illustrative and not restrictive.

We claim:

1. A computer-implemented method of specifying a workflow process on a display screen based on a repository of activities, said method comprising the steps of:
   (a) displaying a plurality of head-tail pairs, wherein
      each of the plurality of heads contains the name of a distinct source activity,
      each of the plurality of tails contains a selector for a user to select an activity from the repository as a corresponding destination activity,
      the head and the tail of each pair are connected and aligned with each other in a horizontal direction of the display screen,
      the plurality of heads are aligned with one another in a vertical direction of the display screen, and
      the plurality of tails are aligned with one another in the vertical direction;
   (b) adding a new activity to the workflow process based on a user action and saving the new activity into the repository;
   (c) selecting an activity from the repository as a destination activity in a tail based on a user selection using the selector;
   (d) determining, by a computer, whether the activity selected in (c) is already a source activity of one of the displayed plurality of head-tail pairs that can be reused or whether the activity selected in (c) is not already a source activity and a new head-tail pair must be added;
   (e) responsive to a determination in (d) that the selected activity is not already a source activity, adding a new head-tail pair to the display, wherein the head of the new pair contains the name of the selected activity and the tail contains a selector for a user to select an activity from the repository as the corresponding destination activity; and
   (f) responsive to a determination in (d) that the selected activity is already a source activity, reusing an existing head-tail pair on the display.

2. A method according to claim 1, further comprising the step of:
   (g) repeating steps (c), (d), (e) and (f) for each further activity specified in the workflow process.

3. A method according to claim 2, further comprising the step of:
   deleting an activity from the workflow process.

4. A non-transitory computer-readable storage medium having a program recorded thereon causing a computer apparatus to execute a method of specifying a workflow process on a display screen based on a repository of activities, the method comprising the steps of:
   (a) displaying a plurality of head-tail pairs, wherein
      each of the plurality of heads contains the name of a distinct source activity,
      each of the plurality of tails contains a selector for a user to select an activity from the repository as a corresponding destination activity,
      the head and the tail of each pair are connected and aligned with each other in a horizontal direction of the display screen,
      the plurality of heads are aligned with one another in a vertical direction of the display screen, and
      the plurality of tails are aligned with one another in the vertical direction;
   (b) adding a new activity to the workflow process based on a user action and saving the new activity into the repository;
   (c) selecting an activity from the repository as a destination activity in a tail based on a user selection using the selector;
   (d) adding a new head-tail pair to the display, when the activity selected in (c) is not already a source activity of one of the displayed plurality of head-tail pairs, wherein the head of the new pair contains the name of the selected activity and the tail contains a selector for a user to select an activity from the repository as the corresponding destination activity; and
   (e) reusing an existing head-tail pair on the display, when the activity selected in (c) is already a source activity of the existing head-tail pair.

5. A non-transitory computer-readable storage medium according to claim 4, the method further comprising the step of:
   (f) repeating execution of (c), (d) and (e) for each further activity specified in the workflow process.

6. A non-transitory computer-readable storage medium according to claim 5, the method further comprising the step of:
   deleting an activity from the workflow process.

* * * * *